United States Patent
Vadamalayan et al.

(10) Patent No.: US 11,778,087 B1
(45) Date of Patent: *Oct. 3, 2023

(54) SYSTEMS AND METHODS FOR RESTRICTING CAPTURE OF SELF-PORTRAIT IMAGES ON MOBILE DEVICES

(71) Applicant: GEN DIGITAL INC., Tempe, AZ (US)

(72) Inventors: Muthuramji Vadamalayan, Chennai (IN); Manojkumar Kumar Sundaram, Tamil Nadu (IN); Mohan Raj Senthilnathan, Chennai (IN)

(73) Assignee: GEN DIGITAL INC., Tempe, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/059,673

(22) Filed: Nov. 29, 2022

Related U.S. Application Data

(63) Continuation of application No. 17/205,903, filed on Mar. 18, 2021, now Pat. No. 11,528,355.

(51) Int. Cl.
  *H04M 11/04* (2006.01)
  *H04M 1/72463* (2021.01)
  *G08B 21/02* (2006.01)
  *H04M 1/72454* (2021.01)

(52) U.S. Cl.
  CPC ........ *H04M 1/72463* (2021.01); *G08B 21/02* (2013.01); *H04M 1/72454* (2021.01); *H04M 2250/52* (2013.01)

(58) Field of Classification Search
  CPC ......... H01M 1/72463; H01M 1/72454; H01M 1/72457; G08B 21/02
  See application file for complete search history.

(56) References Cited

U.S. PATENT DOCUMENTS

| | | | |
|---|---|---|---|
| 10,783,645 B2 * | 9/2020 | Liang | G06T 7/194 |
| 11,528,355 B1 * | 12/2022 | Vadamalayan | G08B 21/02 |
| 2016/0155002 A1 * | 6/2016 | Chang | G08B 21/02 348/158 |
| 2020/0092466 A1 * | 3/2020 | Rakshit | H04N 23/661 |

* cited by examiner

*Primary Examiner* — Tuan Pham
(74) *Attorney, Agent, or Firm* — Greenberg Traurig, LLP

(57) ABSTRACT

The disclosed computer-implemented method for restricting capture of self-portrait images on mobile devices may include (i) capturing sensor data associated with a surrounding environment, (ii) detecting a user input for taking one or more self-portrait images, determining, based on the sensor data, one or more potential hazards associated with the taking of the self-portrait images within the surrounding environment, and (iv) performing a security action to protect against the potential hazards associated with the taking of the self-portrait images within the surrounding environment. Various other methods, systems, and computer-readable media are also disclosed.

20 Claims, 7 Drawing Sheets

SYSTEMS AND METHODS FOR RESTRICTING CAPTURE OF SELF-PORTRAIT IMAGES ON MOBILE DEVICES

CROSS-REFERENCE TO RELATED APPLICATION

This application is a continuation of U.S. application Ser. No. 17/205,903, filed Mar. 18, 2021, the disclosure of which is incorporated, in its entirety, by this reference.

BACKGROUND

Parental control software is often utilized on computing devices to restrict various activities considered to be inappropriate for children or other vulnerable users. For example, parental control software may be installed by parents or other responsible parties on a child's mobile device to monitor and/or restrict the use of certain applications utilized for sending messages or accessing potentially inappropriate website content.

Conventional parental control software, however, often lacks the capability of monitoring and restricting activities involving the use of mobile devices in the physical space, such as the growing trend of taking self-portrait images (i.e., "selfies") in dangerous environments by underage (e.g., under twenty-one years of age) or other vulnerable users. In particular, the taking of selfies in high altitude, high velocity, overwater, and/or other hazardous environments may often result in serious injuries and/or fatalities as a result of these users seeking to create disconcerting or alarming images in an effort to impress others (e.g., over social media).

SUMMARY

As will be described in greater detail below, the present disclosure describes various systems and methods for restricting capture of self-portrait images on mobile devices.

In one example, a method for restricting capture of self-portrait images on mobile devices may include (i) capturing, by one or more computing devices, sensor data associated with a surrounding environment, (ii) detecting, by the one or more computing devices, a user input for taking one or more self-portrait images, (iii) determining, by the one or more computing devices and based on the sensor data, one or more potential hazards associated with the taking of the self-portrait images within the surrounding environment, and (iv) performing, by the one or more computing devices, a security action to protect against the potential hazards associated with the taking of the self-portrait images within the surrounding environment.

In some embodiments, the sensor data associated with the surrounding environment may include (i) geographic location data (e.g., mountains, bodies of water, etc.), (ii) elevation data (e.g., mountain peaks, buildings, etc.), (iii) velocity data (e.g., a current rate of travel), (iv) and/or environmental data (e.g., safety hazards such as an area where heavy machinery is being operated, low light conditions, etc.). In some examples, the user input detected for taking the self-portrait images may be a user-initiated action for opening a mobile device camera application on a mobile computing device.

In some embodiments, the potential hazards associated with the taking of the self-portrait images within the surrounding environment may be determined by (i) retrieving geofence data describing one or more previously identified hazardous areas and (ii) determining the potential hazards when the sensor data corresponds to the previously identified hazardous areas in the geofence data. Additionally or alternatively, the potential hazards associated with the taking of the self-portrait images within the surrounding environment may be determined by analyzing the sensor data to identify (i) a potential fall hazard within the surrounding environment, (ii) a potential drowning hazard associated within the surrounding environment, or (iii) a potential a vehicular hazard (e.g., a moving car or train) within the surrounding environment.

In some examples, the security action to protect against the potential hazards associated with the taking of the self-portrait images within the surrounding environment may include (i) generating an alert that warns a mobile computing device user of the potential hazards associated with the taking of the self-portrait images within the surrounding environment, (ii) requesting an acknowledgment of the alert from the user, and (iii) sending the alert to another party (e.g., a parent, guardian, or other responsible party via a parental control application) when the acknowledgment of the alert has been discarded by the user. Additionally or alternatively, the security action to protect against the potential hazards associated with the taking of the self-portrait images within the surrounding environment may include restricting the taking of the self-portrait images by (i) imposing an age-based criteria to restrict the taking of self-portrait images on a mobile computing device (e.g., to prevent children from taking selfies in an unsafe environment or previously identified geofenced area), (ii) limiting the taking of the self-portrait images to a predetermined number of images (e.g., a parent, guardian, or other responsible party may limit the number of selfies a child may take on a mobile computing device), and/or (iii) disabling (e.g., via a parental control application) a mobile device camera application utilized for taking self-portrait image on a mobile computing device.

In one embodiment, a system for restricting capture of self-portrait images on mobile devices may include at least one physical processor and physical memory that includes computer-executable instructions and a set of modules that, when executed by the physical processor, cause the physical processor to (i) capture, by a capture module, sensor data associated with a surrounding environment, (ii) detect, by a detection module, a user input for taking one or more self-portrait images, (iii) determine, by a determining module and based on the sensor data, one or more potential hazards associated with the taking of the self-portrait images within the surrounding environment, and (iv) perform, by a security module, a security action to protect against the potential hazards associated with the taking of the self-portrait images within the surrounding environment.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) capture sensor data associated with a surrounding environment, (ii) detect a user input for taking one or more self-portrait images, (iii) determine, based on the sensor data, one or more potential hazards associated with the taking of the self-portrait images within the surrounding environment, and (iv) perform a security action to protect against the potential hazards associated with the taking of the self-portrait images within the surrounding environment.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the present disclosure.

Figure 1:
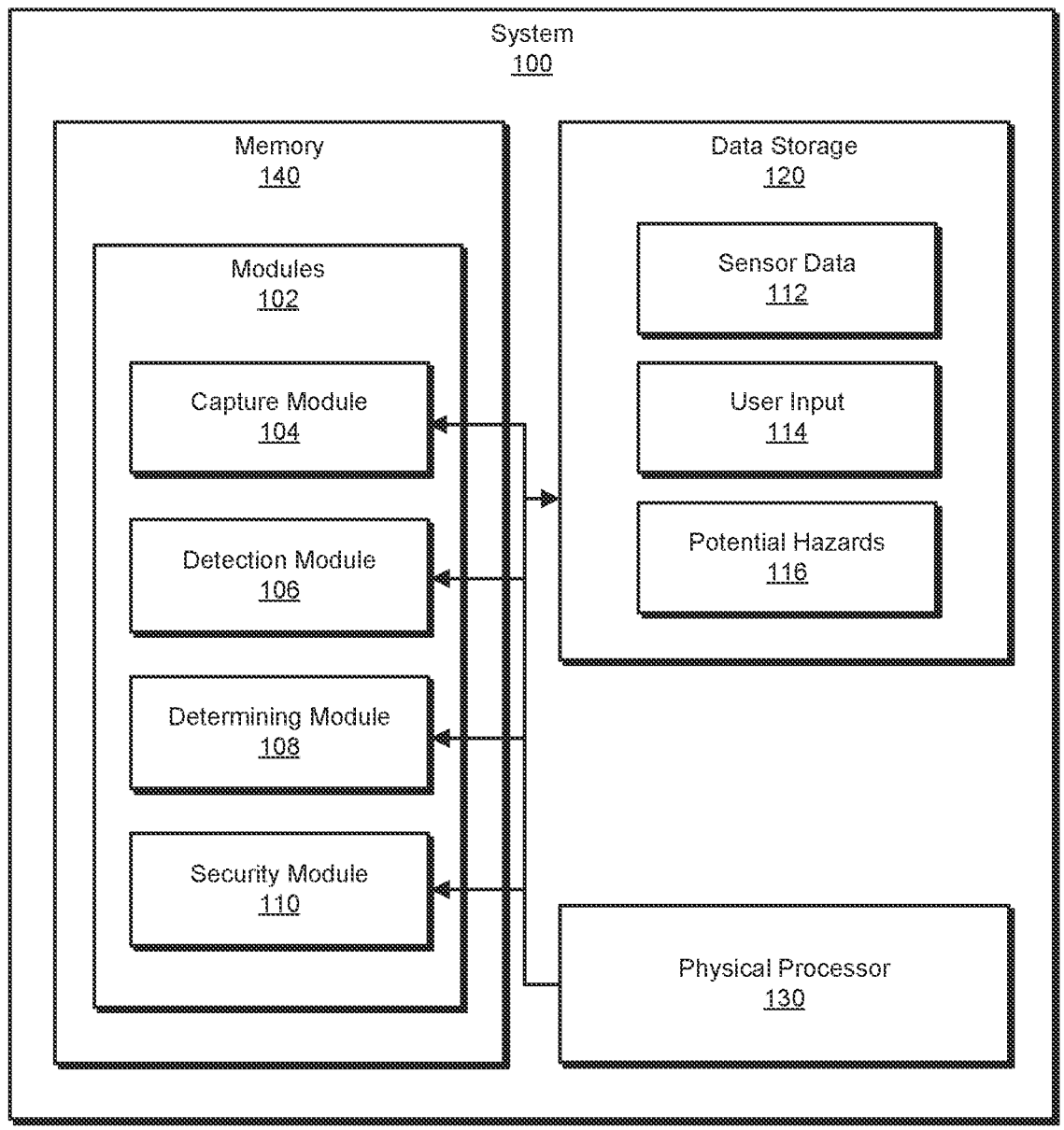
FIG. 1 is a block diagram of an example system for restricting capture of self-portrait images on mobile devices.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the present disclosure covers all modifications, equivalents, and alternatives falling within the scope of the appended claims.

DETAILED DESCRIPTION OF EXAMPLE EMBODIMENTS

The present disclosure is generally directed to systems and methods for restricting capture of self-portrait images on mobile devices. As will be described in greater detail below, the systems and methods described herein may utilize mobile device sensor information in combination with a parental control policy to restrict the taking of self-portrait images (i.e., "selfies") in high-risk areas, thereby potentially preventing severe injury and/or death from related accidents (e.g., falling from an elevated surface, drowning, etc.) when taking selfies. By utilizing mobile sensor information and the parental control policy in this way, the systems and methods described herein may identify potential hazardous areas where a mobile device user is attempting to take a selfie and then implement one or more device restrictions through the use of alerts and other security measures, thereby reducing the occurrence of potentially fatal accidents associated with the taking of selfies when compared to conventional parental control software lacking the aforementioned security features.

For example, the systems and methods described herein may utilize mobile device sensors to detect that a user is attempting to take a selfie in a geofenced area (which may be predetermined by a parental control policy or be identified by a blacklist of suggested "no-selfie" zones in high-risk areas including bodies of water, mountain peaks, and/or tall buildings) within a potentially hazardous environment, generate an alert warning the user of the potentially hazardous environment, and further either completely restrict a mobile device from taking selfies (e.g., by disabling a mobile device camera application) or restrict the taking of selfies to a predetermined number of images over a certain time period (e.g., a maximum number of selfies that may be taken over a 24 hour period). The systems and methods described herein may also generate an alert notifying a parent, guardian, or other responsible party when the alert to the user (e.g., a child user) warning of the potentially hazardous environment is disregarded.

In addition, the systems and methods described herein may improve the field of computing device security by increasing the effectiveness of parental control policy enforcement by restricting and/or preventing the use of mobile device applications (e.g., mobile device camera applications) in potentially hazardous environments and further by notifying responsible parties (e.g., parents) of potentially dangerous situations involving the use of mobile applications by children or other vulnerable parties.

Figure 2:
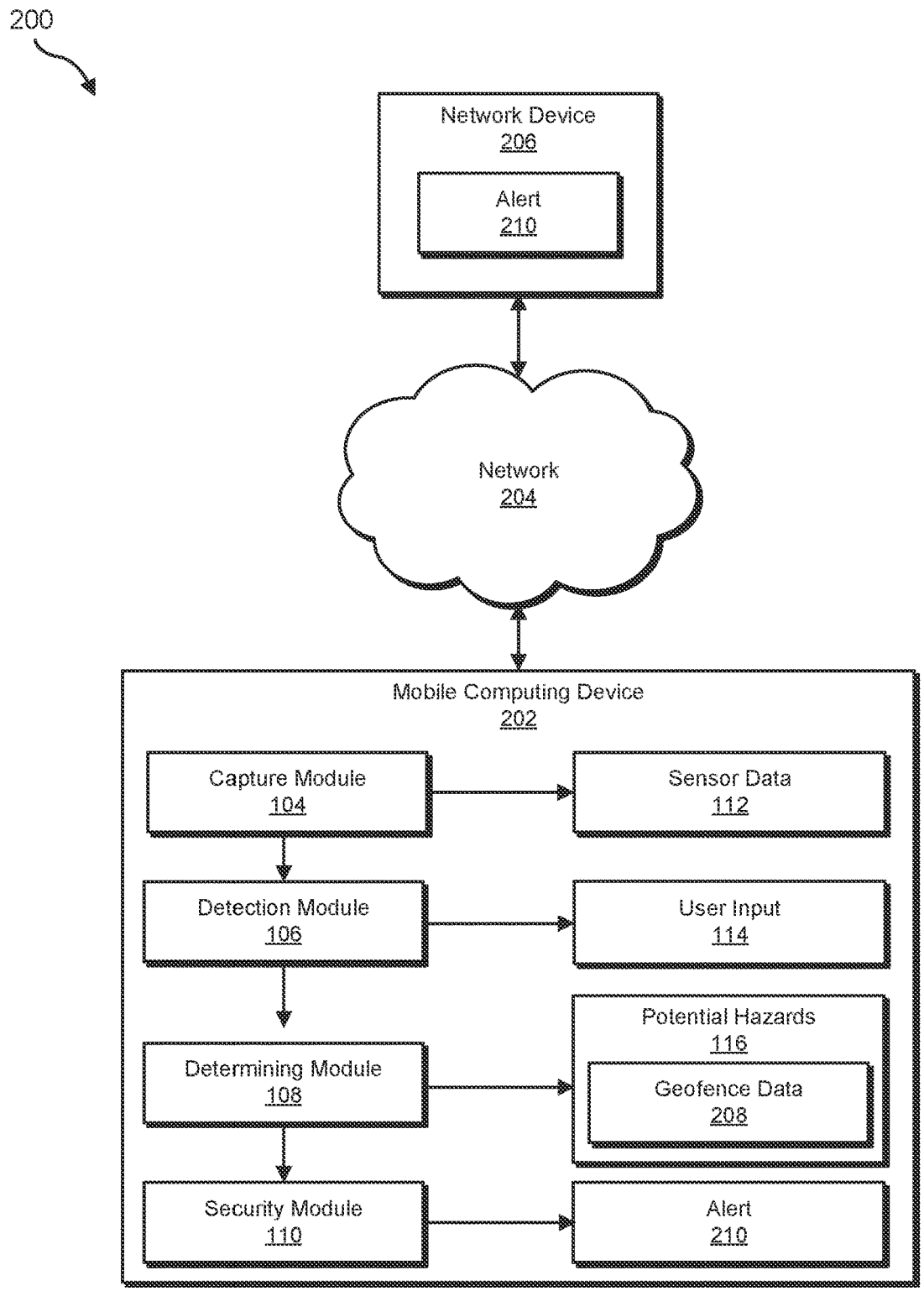
FIG. 2 is a block diagram of an additional example system for restricting capture of self-portrait images on mobile devices.

The following will provide, with reference to FIGS. 1-2, detailed descriptions of example systems for restricting capture of self-portrait images on mobile devices. Detailed descriptions of corresponding computer-implemented methods will also be provided in connection with FIGS. 3-4. In addition, a detailed description of user restrictions that may be applied by an example system for restricting capture of self-portrait images on mobile devices will also be provided in connection with FIG. 5. In addition, detailed descriptions of an example computing system and network architecture capable of implementing one or more of the embodiments described herein will be provided in connection with FIGS. 6 and 7, respectively.

FIG. 1 is a block diagram of an example system 100 for utilizing user identity notifications to protect against potential privacy attacks on mobile devices. As illustrated in this figure, example system 100 may include one or more modules 102 for performing one or more tasks. For example, and as will be explained in greater detail below, example system 100 may include a capture module 104 that captures sensor data 112 associated with a surrounding environment with respect to a mobile computing device. Example system 100 may additionally include a detection module 106 that detects a user input 114 for taking one or more self-portrait images (e.g., "selfies") utilizing a mobile computing device in the surrounding environment. Example system 100 may also include a determining module 108 that determines, based on sensor data 112, potential hazards 116 associated with the taking of the self-portrait images within the surrounding environment. Example system 100 may additionally include a security module 110 that performs a security action to protect against potential hazards 116 associated with the taking of the self-portrait images within the surrounding environment.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., mobile computing device 202). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate utilizing user identity notifications to protect against potential privacy attacks on mobile devices. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include a data storage 120 for storing data. In one example, data storage 120 may store sensor data 112. Data storage 120 may also store data representing user input 114 and potential hazards 116.

Example system 100 in FIG. 1 may be implemented in a variety of ways. For example, all or a portion of example system 100 may represent portions of example system 200 in FIG. 2. As shown in FIG. 2, system 200 may include a mobile computing device 202 in communication with a network device 206 via a network 204. In one example, all or a portion of the functionality of modules 102 may be performed by mobile computing device 202, network device 206, and/or any other suitable computing system. As will be described in greater detail below, one or more of modules 102 from FIG. 1 may, when executed by at least one processor of mobile computing device 202, enable mobile computing device 202 to restrict capture of self-portrait images on mobile devices.

For example, capture module 104 may capture sensor data 112 associated with a surrounding environment. Next, detection module 106 may detects user input 114 for taking one or more self-portrait images (e.g., "selfies") in the surrounding environment. Then, determining module 108 may, based on sensor data 112, determine (e.g., based on geofence data 208) potential hazards 116 associated with the taking of the self-portrait images within the surrounding environment. Finally, security module 110 may perform a security action (e.g., generate an alert 210) to protect against potential hazards 116 associated with the taking of the self-portrait images within the surrounding environment.

Mobile computing device 202 generally represents any type or form of computing device capable of reading computer-executable instructions. In some examples, mobile computing device 202 may be an endpoint device running client-side parental control software for providing privacy and data protection against the malicious installation and use of privacy-invasive mobile applications as well as against the malicious use of privacy-invasive features provided by other mobile applications (such as those that utilize location tracking and store user browsing history data). Additional examples of mobile computing device 202 include, without limitation, laptops, tablets, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Network device 206 generally represents any type or form of computing device that is capable of reading computer-executable instructions. In some examples, network device 206 may be an endpoint device, which may be associated with a parent, guardian, or other responsible party, running client-side parental control software for monitoring and restricting access to content on another user's computing device (e.g., a child's mobile computing device). Additional examples of network device 206 include, without limitation, laptops, tablets, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Network 204 generally represents any medium or architecture capable of facilitating communication or data transfer. In one example, network 204 may facilitate communication between mobile computing device 202 and network device 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
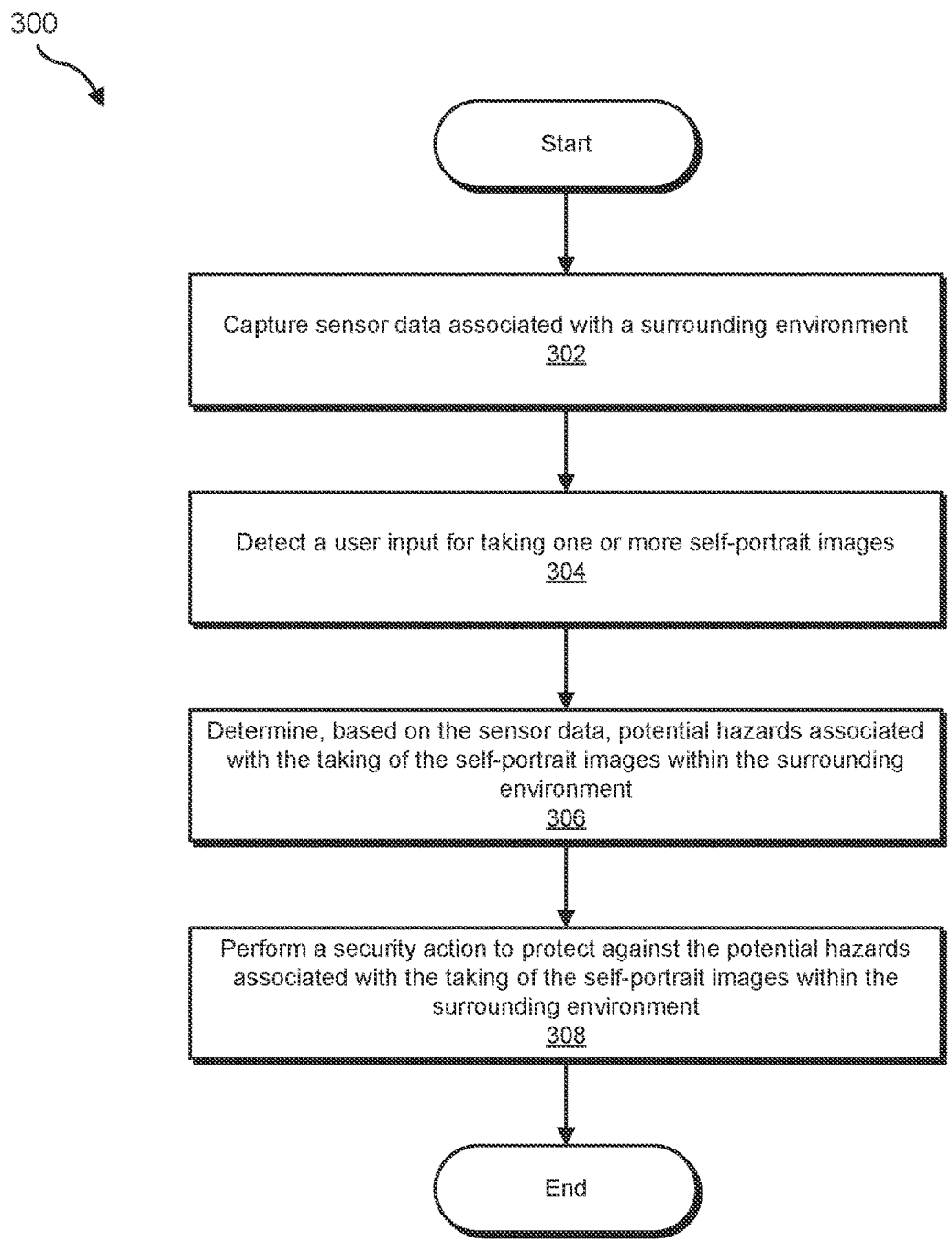
FIG. 3 is a flow diagram of an example method for restricting capture of self-portrait images on mobile devices.

FIG. 3 is a flow diagram of an example computer-implemented method 300 for restricting capture of self-portrait images on mobile devices. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein may capture sensor data associated with a surrounding environment for a mobile computing device. For example, capture module 104 may, as part of mobile computing device 202 in FIG. 2, capture sensor data 112 associated with a surrounding environment. In some examples, mobile computing device 202 may be configured with one or more internal or external sensors capable of detecting various characteristics associated with indoor or outdoor environments including, without limitation, a proximity sensor, an accelerometer, a magnetometer (e.g., a compass), a gyroscope, a barometer, a global positioning system (GPS), a microphone, a camera, a thermometer, an air humidity sensor, etc.

The term "surrounding environment," as used herein, generally refers to any geographic location that includes an area surrounding a user who is currently in possession of a mobile computing device. For example, the summit of a mountain (i.e., a mountain top) may be the surrounding environment for a mountain climber carrying a smartphone for the purpose of taking a self-portrait photograph or selfie.

Capture module 104 may capture sensor data 112 in a variety of ways. In some examples, capture module 104 may retrieve data captured by one or more internal or external sensors associated with mobile computing device 202. For example, capture module 104 may be configured to retrieve geographic location data from a GPS sensor (e.g., to determine if mobile computing device 202 is located in a mountainous area or near a body of water), elevation data from a gyroscope (e.g., to determine if mobile computing device 202 is on a high floor of a building), velocity data from an accelerometer (e.g., to determine a current rate of travel and direction of mobile computing device 202), and environmental data (e.g., to determine a current level of ambient light, noise, and temperature in an area containing mobile computing device 202) from a combination of a temperature sensor, ambient light sensor, microphone, and/or a camera.

At step 304, one or more of the systems described herein may detect a user input for taking one or more self-portrait images. For example, detection module 106 may, as part of mobile computing device 202 in FIG. 2, detect user input 114 for taking one or more self-portrait images (e.g., "selfies") in the surrounding environment.

Detection module 106 may detect user input 114 in a variety of ways. In some embodiments, detection module 106 may detect a user-initiated action for opening a mobile device camera application on mobile computing device 202. For example, a user of mobile computing device 202 may access a camera application prior to engaging one or more features (e.g., selecting a camera or video mode, initiating a countdown timer, configuring picture quality setting or white balance settings, selecting an exposure, and/or releasing the camera shutter) associated with to take a selfie.

At step 306, one or more of the systems described herein may determine, based on the sensor data captured at step 302, potential hazards associated with the taking of self-portrait images within the surrounding environment. For example, determining module 108 may, as part of mobile computing device 202 in FIG. 2, determine, based on sensor data 112, one or more potential hazards 116 associated with the taking of self-portrait images in the surrounding environment.

The term "potential hazards," as used herein, generally refers to any condition in a surrounding environment where there is a high risk of an injury occurring based on a user engagement with a mobile computing device. For example, a user attempting to take a selfie while standing on a high or elevated surface (e.g., the top of a tall building or a mountain top) may be at risk of incurring a falling injury due to being distracted by actively attempting to take a selfie. Additionally or alternatively, a user attempting to take a selfie while near a deep body of water may be at risk of incurring a drowning injury due to being distracted by actively attempting to take a selfie. Additionally or alternatively, a user attempting to take a selfie while in or near a moving vehicle (e.g., a moving car or train) may be at risk of incurring a vehicular injury due to being distracted by actively attempting to take a selfie. In some examples, potential hazards may include one or more previously identified geofenced areas having a history of a high number of accidents occurring due to distracted activity.

Determining module 108 may determine potential hazards 116 in a variety of ways. In some embodiments, determining module 108 may be configured to retrieve geofence data 208 describing one or more previously identified hazardous areas and then determine potential hazards 116 when sensor data 112 corresponds to the previously identified hazardous areas in geofence data 208. For example, determining module 108 may receive GPS data describing a geographic location corresponding to a hazardous area identified in geofence data 208. Additionally or alternatively, determining module 108 may be configured, based on sensor data 112, to identify a potential fall hazard (e.g., when sensor data 112 indicates that a user of mobile computing device 202 is located at a high altitude or elevation), a potential drowning hazard (e.g., when sensor data 112 indicates that a user of mobile computing device 202 is located near a deep body of water), or a potential vehicular hazard (e.g., when sensor data 112 indicates that a user of mobile computing device 202 is traveling at a high rate of speed or near a vehicle traveling at a high rate of speed).

At step 308, one or more of the systems described herein may perform a security action to protect against the potential hazards associated with the taking of the self-portrait images within the surrounding environment. For example, security module 110, as part of mobile computing device 202 in FIG. 2, may perform a security action to protect against potential hazards 116, as determined at step 306, associated with the taking of the self-portrait images within the surrounding environment.

Security module 110 may perform the security action in a variety of ways. In some embodiments, and as will be described in greater detail below with respect to FIG. 4, security module 110 may be configured to warn a user of mobile computing device 202 of potential hazards 116 associated with the taking of the self-portrait images within the surrounding environment. Additionally or alternatively (and as will be described in greater detail below with respect to FIG. 5), security module 110 may be configured to restrict the taking of self-portrait images on the mobile computing device within the surrounding environment.

Figure 4:
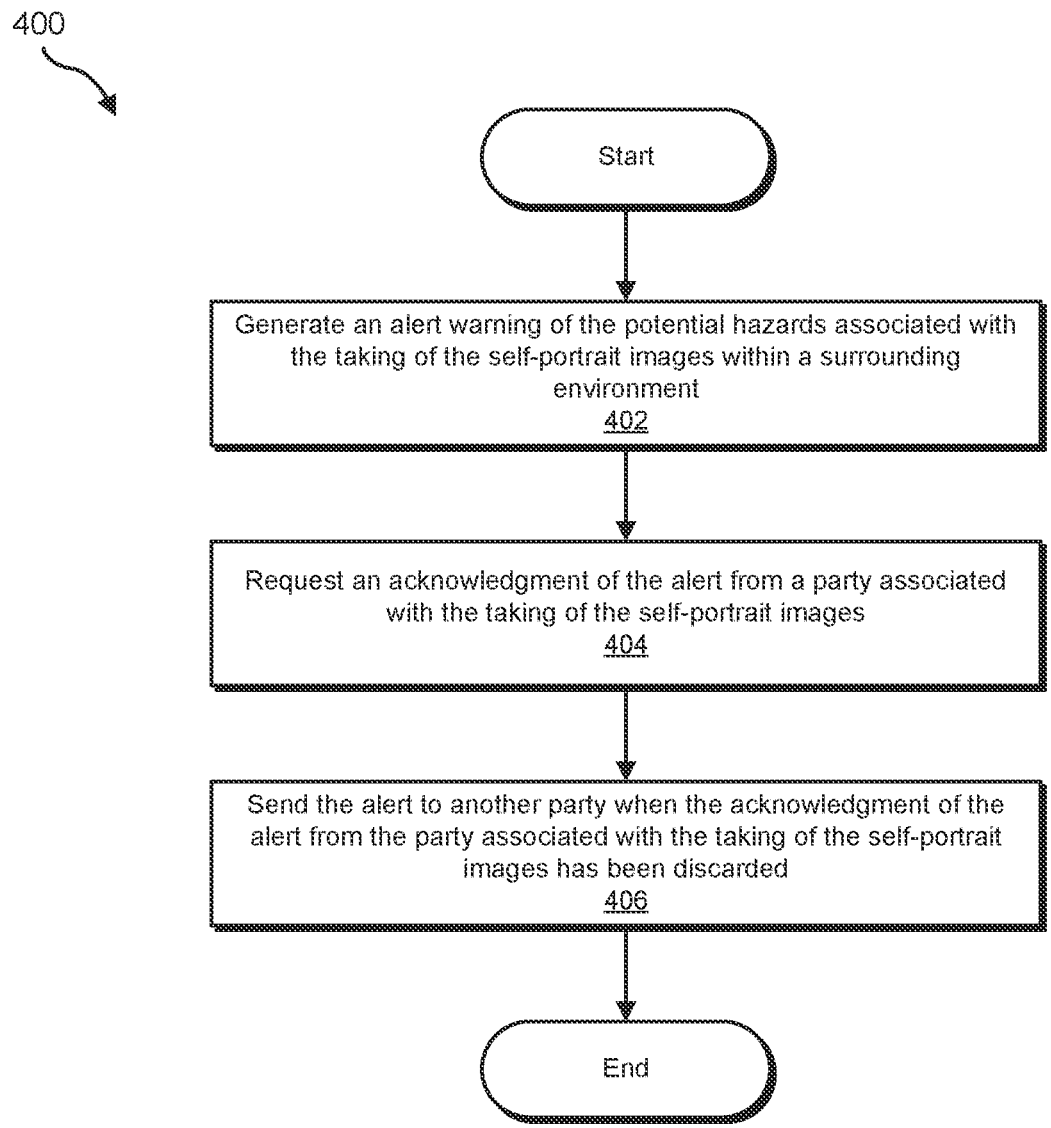
FIG. 4 is a flow diagram of an additional example method for restricting capture of self-portrait images on mobile devices.

Turning now to FIG. 4, a flow diagram of an example computer-implemented method 400 for restricting capture of self-portrait images on mobile devices will now be described. The steps shown in FIG. 4 may be performed by any suitable computer-executable code and/or computing system, including system 100 in FIG. 1, system 200 in FIG. 2, and/or variations or combinations of one or more of the same. In one example, each of the steps shown in FIG. 4 may represent an algorithm whose structure includes and/or is represented by multiple sub-steps, examples of which will be provided in greater detail below.

As illustrated in FIG. 4, at step 402 one or more of the systems described herein may generate an alert warning of potential hazards (as determined at step 306 of FIG. 3) associated with the taking of the self-portrait images within a surrounding environment. For example, security module 110 may, as part of mobile computing device 202 in FIG. 2, generate an alert 210 warning of potential hazards 116 associated with the taking of self-portrait images within the surrounding environment.

Security module 110 may generate alert 210 in a variety of ways. In some embodiments, security module 110 may be configured to display a notification describing a potential hazard 116 (e.g., a falling hazard) upon detecting that a user has opened a camera application (or initiated any other action for activating a mobile computing device camera) on mobile computing device 202. Additionally or alternatively, security module 110 may be configured to display a notification alerting a user that he or she is in a geofenced area previously determined to contain one or more potential hazards 116 upon detecting that the user has opened a camera application (or initiated any other action for activating a mobile computing device camera) on mobile computing device 202.

At step 404, one or more of the systems described herein may request an acknowledgment of the alert generated at step 402 from a party associated with the taking of the self-portrait images. For example, security module 110, as part of mobile computing device 202 in FIG. 2, may request an acknowledgement of alert 210 from the user of mobile computing device 202 prior to taking a selfie.

Security module 110 may request an acknowledgment of alert 210 in a variety of ways. For example, alert 210 generated by security module 110, may include a request for a user input (e.g., via clicking on a touchscreen of mobile computing device 202 or via a verbal command) that the acknowledgment has been received.

At step 406, one or more of the systems described herein may send the alert to another party when the acknowledgment of the alert from the party associated with the taking of the self-portrait images has been discarded. For example, security module 110, as part of mobile computing device 202 in FIG. 2, may send alert 210 to a parent or guardian of a user of mobile computing device 202 when the acknowledgment associated with the taking of the self-portrait images has been discarded.

Security module 110 may send alert 210 to another party when the acknowledgment of alert 210 from the party associated with the taking of the self-portrait images has been discarded, in a variety of ways. For example, security module 110 may be configured to determine that the acknowledgement of alert 210 has been discarded when a request for a user input confirming receipt of the acknowledgment has not been received within a predetermined time period (e.g., less than one minute from the generation of alert 210 on mobile computing device 202). Then, upon determining that the acknowledgement of alert 210 has been discarded, security module 110 may be configured to forward alert 210 to a network device (e.g., another mobile computing device such as network device 206) utilized by a parent, guardian, or other responsible party associated with the user of mobile computing device 202.

Figure 5:
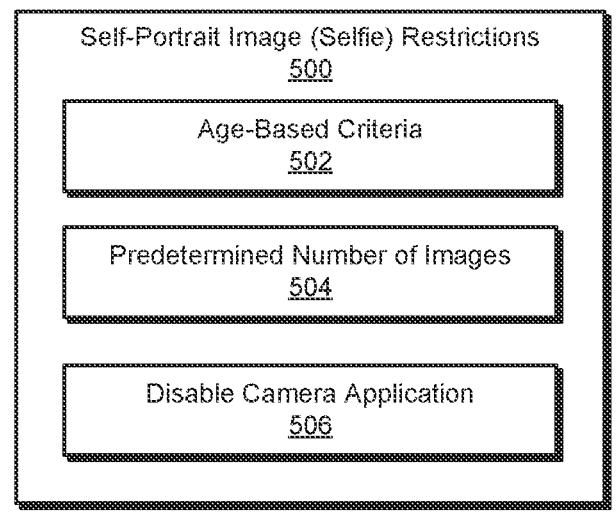
FIG. 5 is a block diagram of example user restrictions that may be applied by an example system for restricting capture of self-portrait images on mobile devices.

FIG. 5 Is a block diagram of example self-portrait image restrictions 500 that may be enforced by security module 110. In some examples, self-portrait image restrictions 500 may include restricting the taking of self-portrait images when an age-based criteria 502 has been met. For example, security module 110 may determine that a user of mobile computing device 202 is under 18 years of age prior to generating alert 210 warning of potential hazards 116 associated with the taking of self-portrait images.

Additionally or alternatively, self-portrait image restrictions 500 may include restricting the taking of self-portrait images to a predetermined number of images 504. For example, security module 110 may, upon determining that a user of mobile computing device 202 is in a geofenced or blacklisted area associated with potential hazards 116 (or, based on sensor data 112, that the user is within an area associated with potential hazards 116), restrict a mobile device camera application to a maximum number of selfies that may be taken (e.g., ten selfies) prior to disabling the mobile device camera application from further use, so as to prevent potential injuries caused by a user's repeated efforts to take "the perfect selfie." In some embodiments, this restriction may be configurable by a responsible party (e.g., a parent or guardian) associated with a user of mobile computing device 202 by enabling parental control settings on mobile computing device 202.

Additionally or alternatively, self-portrait image restrictions 500 may include a disable camera application action 506. For example, security module 110 may, upon determining that a user of mobile computing device 202 is in a geofenced or blacklisted area associated with potential hazards 116 (or, based on sensor data 112, that the user is in area associated with potential hazards 116), disable a camera application on mobile computing device 202 to prevent the user from taking a selfie.

As explained in connection with method 300 above, the systems and methods described herein provide for utilizing mobile device sensor information in combination with a parental control policy to restrict the taking of self-portrait images (i.e., "selfies") in high-risk areas, thereby potentially preventing severe injury and/or death from related accidents (e.g., falling from an elevated surface, drowning, etc.) when taking selfies. By utilizing mobile sensor information and the parental control policy in this way, the systems and methods described herein may identify potential hazardous areas where a mobile device user is attempting to take a selfie and then implement one or more device restrictions through the use of alerts and other security measures, thereby reducing the occurrence of potentially fatal accidents associated with the taking of selfies when compared to conventional parental control software lacking the aforementioned security features. The systems and methods described herein may further utilize mobile device sensors to detect that a user is attempting to take a selfie in a geofenced area (which may be predetermined by a parental control policy or be identified by a blacklist of suggested "no-selfie" zones in high-risk areas including bodies of water, mountain peaks, and/or tall buildings) within a potentially hazardous environment, generate an alert warning the user of the potentially hazardous environment, and further either completely restrict a mobile device from taking selfies (e.g., by disabling a mobile device camera application) or restrict the taking of selfies to a predetermined number of images over a certain time period (e.g., a maximum number of selfies that may be taken over a 24 hour period). The systems and methods described herein may also generate an alert notifying a parent, guardian, or other responsible party when the alert to the user (e.g., a child user) warning of the potentially hazardous environment is disregarded.

Figure 6:
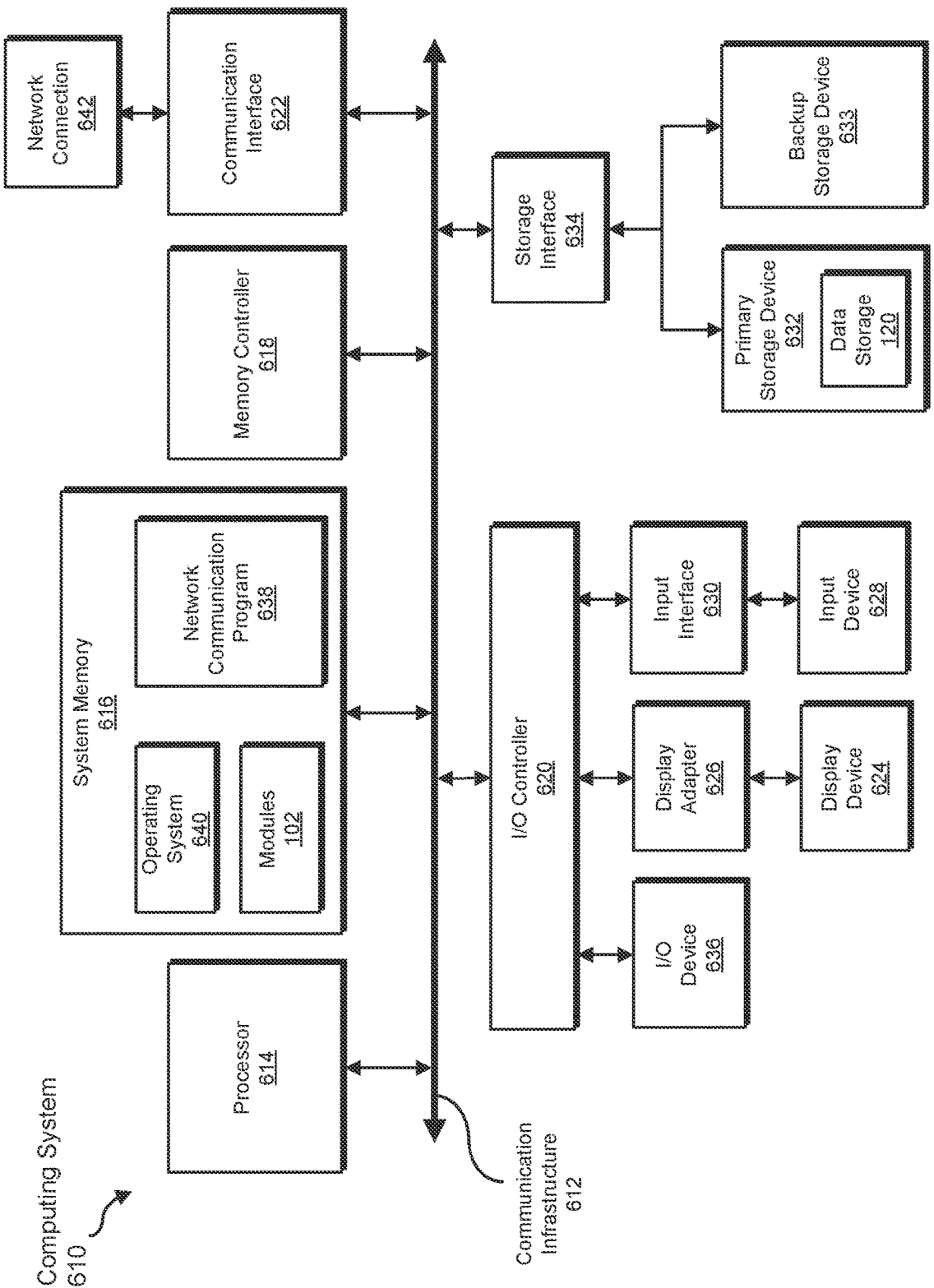
FIG. 6 is a block diagram of an example computing system capable of implementing one or more of the embodiments described and/or illustrated herein.

FIG. 6 is a block diagram of an example computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the example embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In some examples, system memory 616 may store and/or load an operating system 640 for execution by processor 614. In one example, operating system 640 may include and/or represent software that manages computer hardware and software resources and/or provides common services to computer programs and/or applications on computing system 610. Examples of operating system 640 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

As illustrated in FIG. 6, computing system 610 may also include at least one display device 624 coupled to I/O controller 620 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, example computing system 610 may also include at least one input device 628 coupled to I/O controller 620 via an input interface 630. Input device 628 generally represents any type or form of input device capable of providing input, either computer or human generated, to example computing system 610. Examples of input device 628 include, without limitation, a keyboard, a pointing device, a speech recognition device, variations or combinations of one or more of the same, and/or any other input device.

Additionally or alternatively, example computing system 610 may include additional I/O devices. For example, example computing system 610 may include I/O device 636. In this example, I/O device 636 may include and/or represent a user interface that facilitates human interaction with computing system 610. Examples of I/O device 636 include, without limitation, a computer mouse, a keyboard, a monitor, a printer, a modem, a camera, a scanner, a microphone, a touchscreen device, variations or combinations of one or more of the same, and/or any other I/O device.

Communication interface 622 broadly represents any type or form of communication device or adapter capable of facilitating communication between example computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

In some examples, system memory 616 may store and/or load a network communication program 638 for execution by processor 614. In one example, network communication program 638 may include and/or represent software that enables computing system 610 to establish a network connection 642 with another computing system (not illustrated in FIG. 6) and/or communicate with the other computing system by way of communication interface 622. In this example, network communication program 638 may direct the flow of outgoing traffic that is sent to the other computing system via network connection 642. Additionally or alternatively, network communication program 638 may direct the processing of incoming traffic that is received from the other computing system via network connection 642 in connection with processor 614.

Although not illustrated in this way in FIG. 6, network communication program 638 may alternatively be stored and/or loaded in communication interface 622. For example, network communication program 638 may include and/or represent at least a portion of software and/or firmware that is executed by a processor and/or Application Specific Integrated Circuit (ASIC) incorporated in communication interface 622.

As illustrated in FIG. 6, example computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, data storage 120 from FIG. 1 may be stored and/or loaded in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 610 may be configured as an Application Specific Integrated Circuit (ASIC) adapted to implement one or more of the example embodiments disclosed herein.

Figure 7:
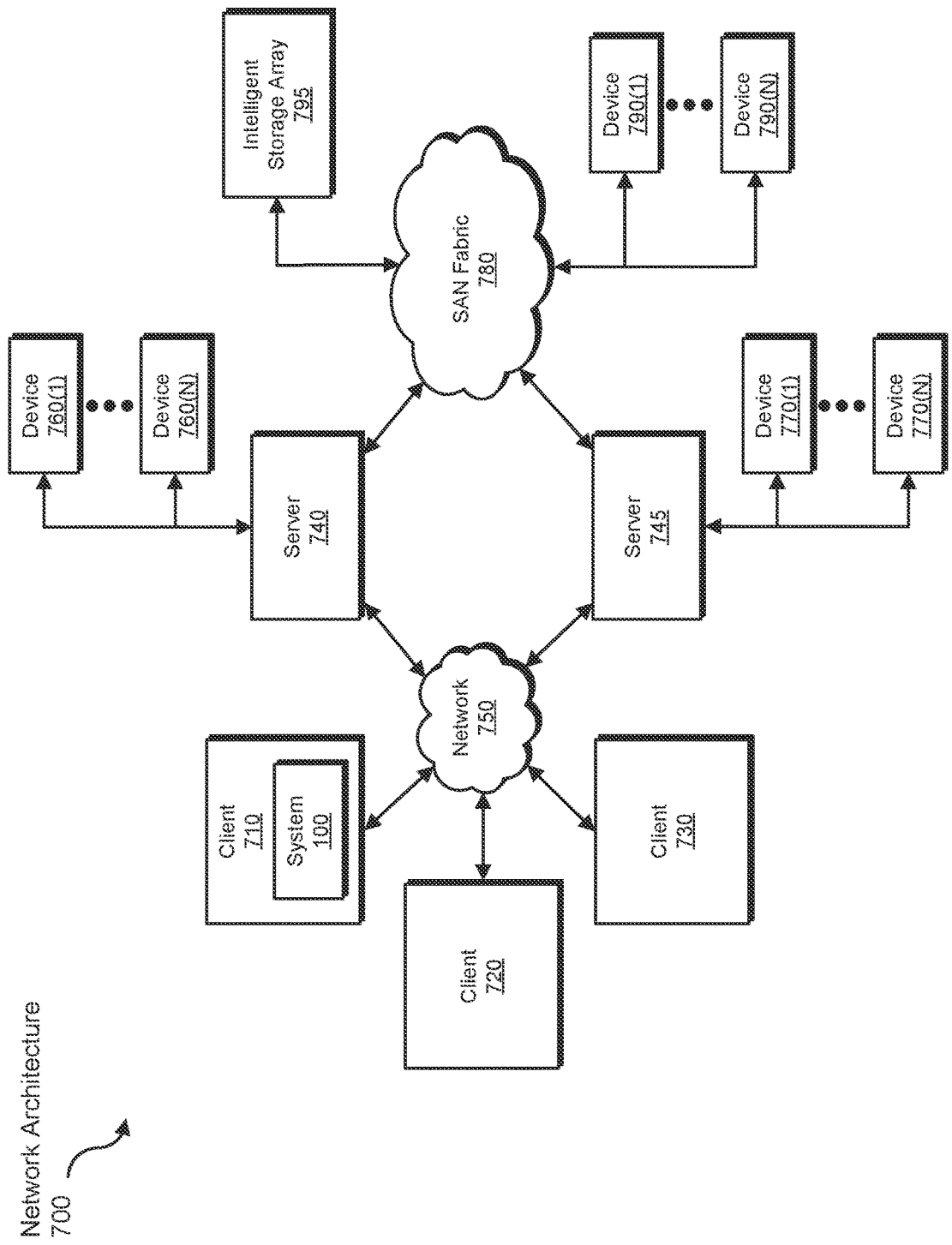
FIG. 7 is a block diagram of an example computing network capable of implementing one or more of the embodiments described and/or illustrated herein.

FIG. 7 is a block diagram of an example network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the present disclosure.

Client systems 710, 720, and 730 generally represent any type or form of computing device or system, such as example computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to example computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the example embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an example method for restricting capture of self-portrait images on mobile devices.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for restricting capture of self-portrait images on mobile devices, at least a portion of the method being performed by one or more computing devices comprising at least one processor, the method comprising:
    capturing, by the one or more computing devices, sensor data associated with a surrounding environment;
    detecting, by the one or more computing devices, a user input for taking one or more self-portrait images;
    determining, by the one or more computing devices and based on the sensor data, one or more potential hazards associated with the taking of the self-portrait images within the surrounding environment; and
    performing, by the one or more computing devices, a security action to protect against the potential hazards associated with the taking of the self-portrait images within the surrounding environment, wherein performing the security action comprises:
        generating an alert comprising a warning of the potential hazards associated with the taking of the self-portrait images within the surrounding environment;
        requesting an acknowledgment of the alert from a party associated with the taking of the self-portrait images; and
        sending the alert to another party when the acknowledgment of the alert from the party associated with the taking of the self-portrait images has been discarded.

2. The computer-implemented method of claim 1, wherein capturing the sensor data associated with the surrounding environment comprises capturing at least one of:
    geographic location data;
    elevation data;
    velocity data; or
    environmental data.

3. The computer-implemented method of claim 1, wherein detecting the user input for taking the self-portrait images comprises detecting a user-initiated action for opening a mobile device camera application.

4. The computer-implemented method of claim 1, wherein determining, based on the sensor data, the potential hazards associated with the taking of the self-portrait images within the surrounding environment comprises:
    retrieving geofence data describing one or more previously identified hazardous areas; and
    determining the potential hazards when the sensor data corresponds to the previously identified hazardous areas in the geofence data.

5. The computer-implemented method of claim 1, wherein determining, based on the sensor data, the potential hazards associated with the taking of the self-portrait images within the surrounding environment comprises identifying at least one of:
- a potential fall hazard within the surrounding environment;
- a potential drowning hazard associated within the surrounding environment; or
- a potential a vehicular hazard within the surrounding environment.

6. The computer-implemented method of claim 1, wherein performing the security action further comprises restricting the taking of the self-portrait images within the surrounding environment.

7. The computer-implemented method of claim 6, wherein restricting the taking of the self-portrait images comprises restricting the taking of the self-portrait images based on an age-based criteria.

8. The computer-implemented method of claim 6, wherein restricting the taking of the self-portrait images comprises limiting the taking of the self-portrait images to a predetermined number of images.

9. The computer-implemented method of claim 6, wherein restricting the taking of the self-portrait images comprises disabling a mobile device camera application utilized for the taking of the self-portrait images.

10. A system for restricting capture of self-portrait images on mobile devices, the system comprising:
- at least one physical processor; and
- physical memory comprising computer-executable instructions and one or more modules that, when executed by the physical processor, cause the physical processor to:
  - capture, by a capture module, sensor data associated with a surrounding environment;
  - detect, by a detection module, a user input for taking one or more self-portrait images;
  - determine, by a determining module and based on the sensor data, one or more potential hazards associated with the taking of the self-portrait images within the surrounding environment; and
  - perform, by a security module, a security action to protect against the potential hazards associated with the taking of the self-portrait images within the surrounding environment, wherein the security module performs the security action by:
    - generating an alert comprising a warning of the potential hazards associated with the taking of the self-portrait images within the surrounding environment;
    - requesting an acknowledgment of the alert from a party associated with the taking of the self-portrait images; and
    - sending the alert to another party when the acknowledgment of the alert from the party associated with the taking of the self-portrait images has been discarded.

11. The system of claim 10, wherein the capture module captures the sensor data associated with the surrounding environment by capturing at least one of:
- geographic location data;
- elevation data;
- velocity data; or
- environmental data.

12. The system of claim 10, wherein the detection module detects the user input for taking the self-portrait images by detecting a user-initiated action for opening a mobile device camera application.

13. The system of claim 10, wherein the determining module determines, based on the sensor data, the potential hazards associated with the taking of the self-portrait images within the surrounding environment by:
- retrieving geofence data describing one or more previously identified hazardous areas; and
- determining the potential hazards when the sensor data corresponds to the previously identified hazardous areas in the geofence data.

14. The system of claim 10, wherein the determining module determines, based on the sensor data, the potential hazards associated with the taking of the self-portrait images within the surrounding environment comprises by identifying at least one of:
- a potential fall hazard within the surrounding environment;
- a potential drowning hazard associated within the surrounding environment; or
- a potential a vehicular hazard within the surrounding environment.

15. The system of claim 10, wherein the security module further performs the security action by restricting the taking of the self-portrait images within the surrounding environment.

16. The system of claim 15, wherein the taking of the self-portrait images is restricted based on an age-based criteria.

17. The system of claim 15, wherein the taking of the self-portrait images is restricted by limiting the taking of the self-portrait images to a predetermined number of images.

18. A non-transitory computer-readable medium comprising one or more computer-executable instructions that, when executed by at least one processor of a computing device, cause the computing device to:
- capture sensor data associated with a surrounding environment;
- detect a user input for taking one or more self-portrait images;
- determine, based on the sensor data, one or more potential hazards associated with the taking of the self-portrait images within the surrounding environment; and
- perform a security action to protect against the potential hazards associated with the taking of the self-portrait images within the surrounding environment, wherein the one or more computer-executable instructions cause the computing device to perform the security action by:
  - generating an alert comprising a warning of the potential hazards associated with the taking of the self-portrait images within the surrounding environment;
  - requesting an acknowledgment of the alert from a party associated with the taking of the self-portrait images; and
  - sending the alert to another party when the acknowledgment of the alert from the party associated with the taking of the self-portrait images has been discarded.

19. The non-transitory computer-readable medium of claim 18, wherein the one or more computer-executable instructions further cause the computing device to perform the security action by restricting the taking of the self-portrait images within the surrounding environment.

20. The non-transitory computer-readable medium of claim 19, wherein the taking of the self-portrait images is restricted based on an age-based criteria.

\* \* \* \* \*